(No Model.)
2 Sheets—Sheet 1.
J. A. MEHAFFEY.
CONDUIT FOR ELECTRIC WIRES.
No. 276,190. Patented Apr. 24, 1883.
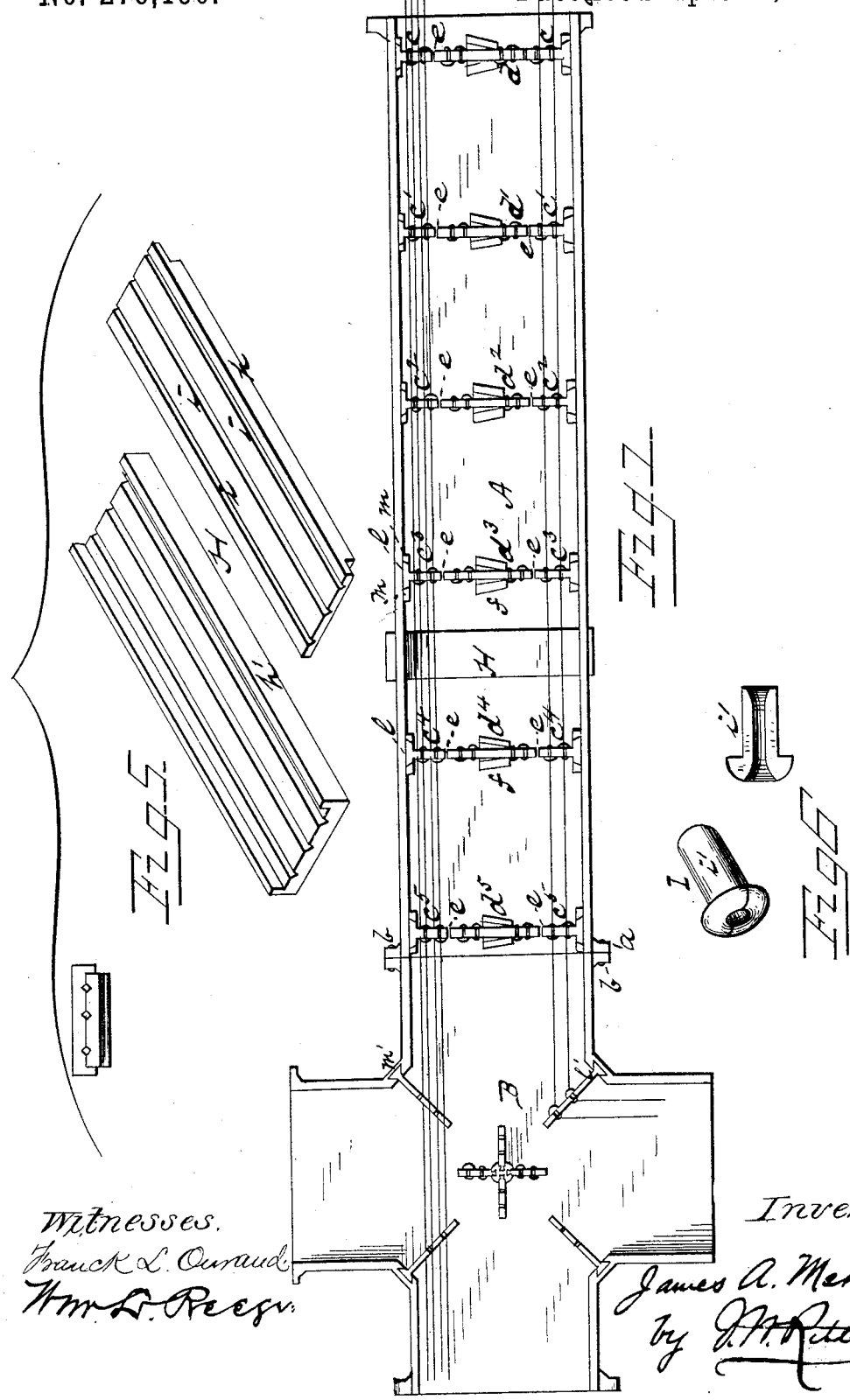
Witnesses.
Franck L. Ourand
Wm. L. Reese
Inventor:
James A. Mehaffey
by J. A. Ritter
atty (No Model.) 2 Sheets—Sheet 2.
J. A. MEHAFFEY.
CONDUIT FOR ELECTRIC WIRES.
No. 276,190. Patented Apr. 24, 1883.
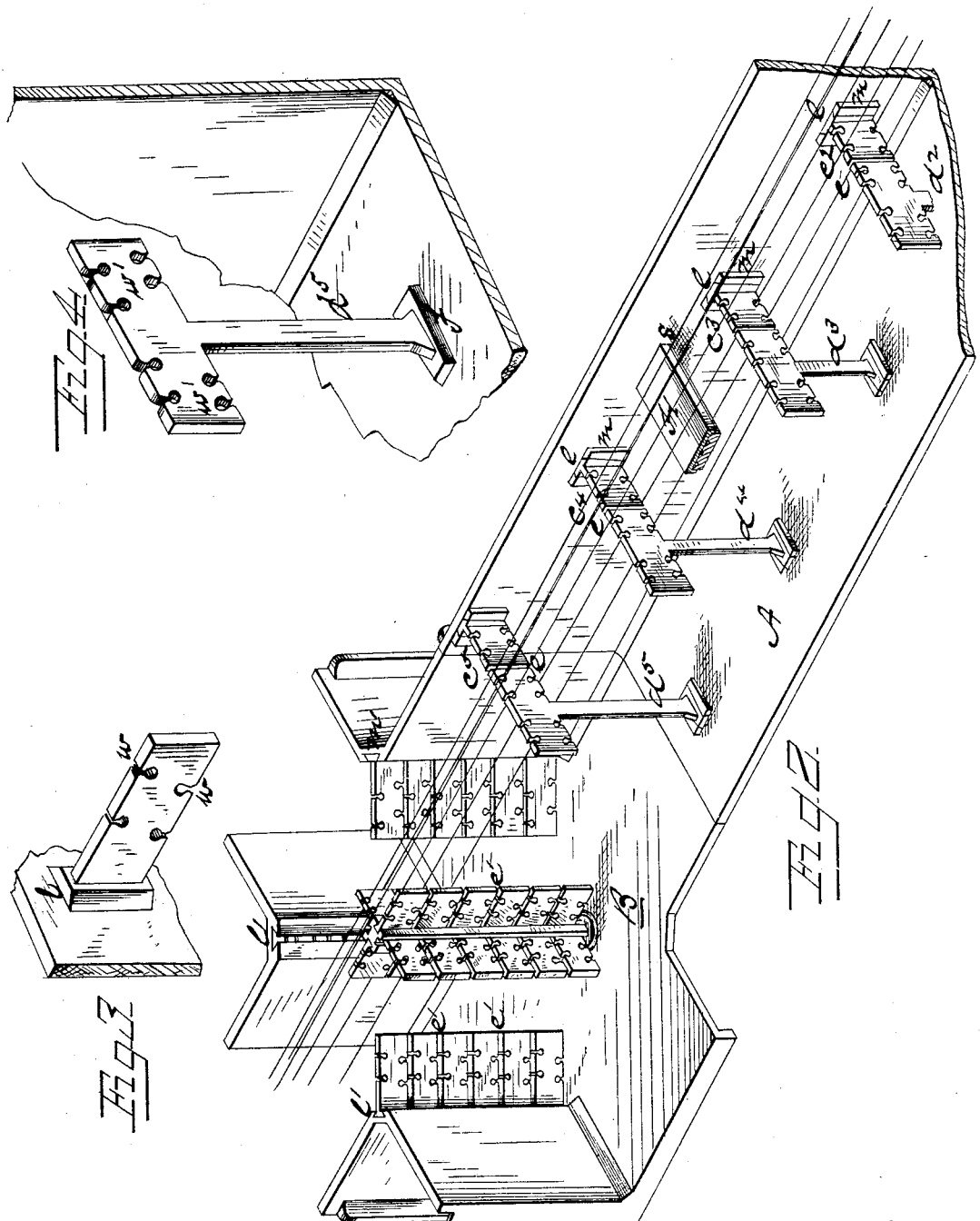
Witnesses
Franck L. Durand
Wm. L. Reese
Inventor
James A. Mehaffey
by J. M. Ritter
atty

UNITED STATES PATENT OFFICE.

JAMES A. MEHAFFEY, OF PARNASSUS, PENNSYLVANIA.

CONDUIT FOR ELECTRIC WIRES.

SPECIFICATION forming part of Letters Patent No. 276,190, dated April 24, 1883.

Application filed June 12, 1882. (No model.)

*To all whom it may concern:*

Be it known that I, JAMES A. MEHAFFEY, a citizen of the United States, residing at Parnassus, in the county of Westmoreland and State of Pennsylvania, have invented certain new and useful Improvements in Conduits for Electric Wires; and I do hereby declare the following to be a full, clear, and exact description of the same, reference being had to the accompanying drawings, forming a part of this specification, in which—

Figure 1 is a plan view of a line-section and an angle-section or corner-box. Fig. 2 is a perspective view of the same, one of the sides and the wires having been removed to show the relation of the trees or posts and brackets. Figs. 3 and 4 are detail sectional views, showing the manner of securing the brackets to the conduits and the wires to the brackets. Fig. 5 is a detail view of the cross-conduit. Fig. 6 is a detached view of the insulator.

Like letters refer to like parts wherever they occur.

My invention relates to the construction of conduits or containers for electric and other wires, either for underground or surface lines, and has for its object to so utilize the space as to accommodate the greatest number of wires, and at the same time so construct and arrange the supports as to facilitate the insertion, removal, or testing of any wire or wires of the series without disturbing the remaining wires.

It has also for a further object the providing of means whereby telephone-wires, wires for electric lighting, or like purposes may be conducted through or across the conduit without interfering with the line-wires contained therein.

I will now proceed to describe my invention more specifically, so that others skilled in the art to which it appertains may apply the same.

In the drawings, A indicates the line-section, and B the angle-section or corner-box. The section of the conduits A or boxes B may be made of any required length or size, of wood, iron, or other metal, terra-cotta or other desired material, and any suitable means for obtaining tight joints between the sections and of hermetically closing the joints between the box and cover may be adopted. By preference the sections A are about ten feet in length, and both A and B are made of wrought or cast iron, with coupling-flanges $a$, which should be planed or ground off to obtain a tight joint between sections, the several sections being connected by suitable bolts, $b$.

Within the sections A, at suitable intervals, I arrange a series of brackets, $c\ c'\ c^2\ c^3\ c^4\ c^5$, at gradually-increasing heights above the bottom of the conduit, each bracket adapted to receive a course of two or more sets of wires, and only such wires as pass in the horizontal plane in which said bracket is arranged. Between the said brackets I arrange a series of posts or trees, $d\ d'\ d^2\ d^3\ d^4\ d^5$, the wire-supports of which occupy the same plane as the respective brackets $c\ c'$ &c., taking care to leave such space or channel E between the corresponding brackets and trees as will permit the unobstructed passage of a line-wire. The number and distance apart of the several sets of brackets and trees, as well as their relative heights, will be determined by the necessities of the case or the will of the constructer.

The brackets $c\ c'$, &c., are preferably of metal, and each bracket is provided with two or more irregularly-arranged rows of open-slotted wire-holes, $w$, and a wedge-shaped dovetailed lug, $l$, by means of which it is removably attached to the side wall of the conduit A, the wedge-shaped lug being inserted in a corresponding recess formed by lugs $m$ on the side walls of the conduit. The trees or posts $d\ d'$, &c., have each a similar row or rows of open-slotted wire-holes $w'$, and are preferably detachably connected to the bottom of the conduit or box $a$ by dovetailed wedge-shaped feet $f$.

The dovetailed wedge-shaped device for securing the bracket and tree is, as specified, the preferred form; but it is evident that equivalent well-known means may be employed, or the bracket and tree may be permanently attached to the conduit, the object in view being to definitely fix their height.

In the angle or corner box B, when the direction of only a definite and predetermined number of wires is to be changed, the brackets may be inserted and arranged as hereinbefore specified; but where wires from all the horizontal planes or courses are to change directions, I prefer to arrange the brackets at the angles, as shown in Figs. 1 and 2. In such cases the angles of the sections and the center post are formed with continuous vertical dovetailed recesses M', of uniform width throughout, and the brackets are provided with dovetailed lugs l', of uniform width, corresponding to the recesses; but the lugs l' project beyond the brackets, so as to preserve horizontal channels e' between the same for the insertion and withdrawal of the separate wires. In other respects the brackets are similar to those previously described.

The arrangement of the brackets within the angle or corner box B is such that those upon the post form a cross to receive and support the cross-lines of wire, while those at the angles radiate and serve to support the wires whose general direction is changed.

H indicates the cross-conduit for telephone and like wires which it is desirable to pass through the main conduit. It consists of two longitudinal sections, $h$ and $h'$, of glass or equivalent insulating material, the one section, $h$, being provided with longitudinal grooves $i\ i$ on its upper surface for the reception of the electric wires, and cut away at its ends to rest and lock within slots $s$ in the sides of conduit A, and the other or slide section, $h'$, having flanges on its sides, which, when the parts are together, insures a close joint between the same, and longitudinal grooves upon its lower surface, which correspond with the grooves in section $h$. When this device is to be used for crossing conduit A the slots $s$ are made in conduit A at the desired points, the section $h$ inserted, and the crossing wires arranged in the grooves thereof, after which the section $h'$ is laid upon the wires and pushed through the slots into position over section $h$.

I indicates the glass insulators for use with the brackets' wires. These insulators are of tubular form, with bell-mouths, which prevent the accumulation of moisture within the tube, and of such external form as adapts them to fit within the wire-holes $w$ of the brackets. They are composed of two or more longitudinal sections, $i'\ i'$, which, when fitted together, form a tube for the reception of the wire.

The devices being substantially such as specified, the wires are inserted within the conduit by first passing the lowest wires down through the channels $e$ between the trees and brackets, and then along the edges of the lower brackets until opposite the slotted openings, into which they can be readily passed. The insulator-sections $i\ i$ are then placed around the wire, so as to inclose the same, a small rubber packing being placed between the sections, if found desirable, and the insulator is then slipped along the wire until it enters the hole $w$ in the bracket or tree, as the case may be, thus effectually securing the wire to the bracket. The next lowest set of wires is then passed through the channels $e$ and adjusted in the next lowest bracket in like manner, and so on until all the wires have been arranged within the conduit. At the angle or corner box B the wires are passed into the lateral channels $e'$ until opposite the desired slotted opening, when they may be inserted and secured by the separable tubular insulators I, as before specified.

It is evident that as unobstructed channels extend around and between all of the several brackets and trees any wire or wires of the series may be inserted or withdrawn without interfering with any other wire or wires of the series, and also that as the several courses of wires are supported at different intervals there is no liability of contact between the same from sagging or other cause, while the brackets are not so clustered or grouped as to interfere with the manipulations of the wires supported by the brackets, all of which, together with the simplicity of construction and the detachability of the brackets, &c., are important advantages.

Having thus described my invention, what I claim, and desire to secure by Letters Patent, is—

1. A conduit for electric wires, provided with a series of independent supports or brackets having slotted wire-holes, said brackets arranged at intervals within the conduit and at different heights to support the different courses of wires, substantially as and for the purpose specified.

2. An electric-wire conduit provided with a series of detachable brackets or wire-supports having slotted wire-holes, said brackets arranged with relation to each other to form wire-channels between the same, and vertically aligned one with the other, substantially as and for the purpose specified.

3. The combination, with an electric-wire conduit, of a transversely-arranged cross-conduit of insulating material having a detachable longitudinally-sliding cap or cover section, substantially as and for the purpose specified.

4. The combination, with a conduit for electric wires, of a series of interspaced brackets or wire-supports arranged at intervals and at gradually-increasing heights from the bottom of the box to give independent support to the respective courses of wires, substantially as and for the purpose specified.

5. The combination, with a conduit for electric wires, of a series of trees or wire-supports, arranged centrally thereof at intervals and of varying height, and a series of correspondingly-arranged side brackets attached to the conduit, to afford independent support to the separate courses of wires, substantially as and for the purpose specified.

In testimony whereof I affix my signature, in presence of two witnesses, this 9th day of June, 1882.

JAMES A. MEHAFFEY.

Witnesses:
F. W. RITTER, Jr.,
H. B. MOULTON.